(12) United States Patent
Beckett et al.

(10) Patent No.: US 12,395,418 B2
(45) Date of Patent: *Aug. 19, 2025

(54) NETWORK VERIFICATION SYSTEMS AND METHODS

(71) Applicant: Microsoft Technology Licensing, LLC, Redmond, WA (US)

(72) Inventors: Ryan Andrew Beckett, Redmond, WA (US); Karthick Jayaraman, Kirkland, WA (US); Neha Milind Raje, Redmond, WA (US); Jitendra Padhye, Redmond, WA (US); Christopher Scott Johnston, Redmond, WA (US); Steven Jeffrey Benaloh, Seattle, WA (US); Nikolaj Bjorner, Woodinville, WA (US); Andrey Aleksandrovic Rybalchenko, Cambridge (GB); Nuno Cerqueira Afonso, Cambridge (GB); Nuno Claudino Pereira Lopes, Cambridge (GB); Sharad Agarwal, Seattle, WA (US); Hang Kwong Lee, Issaquah, WA (US); Aniruddha Parkhi, Bothell, WA (US); Maik Riechert, Cambridge (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 271 days.

This patent is subject to a terminal disclaimer.

(21) Appl. No.: 18/017,654

(22) PCT Filed: Apr. 30, 2021

(86) PCT No.: PCT/US2021/030028
§ 371 (c)(1),
(2) Date: Jan. 23, 2023

(87) PCT Pub. No.: WO2022/019982
PCT Pub. Date: Jan. 27, 2022

(65) Prior Publication Data
US 2023/0300053 A1    Sep. 21, 2023

Related U.S. Application Data

(63) Continuation-in-part of application No. 17/115,379, filed on Dec. 8, 2020, now Pat. No. 11,121,934.
(Continued)

(51) Int. Cl.
*H04L 43/50* (2022.01)
*H04L 41/14* (2022.01)
*H04L 43/06* (2022.01)

(52) U.S. Cl.
CPC ............ *H04L 43/50* (2013.01); *H04L 41/145* (2013.01); *H04L 43/06* (2013.01)

(58) Field of Classification Search
CPC ........ H04L 43/50; H04L 41/145; H04L 43/06
See application file for complete search history.

(56) References Cited

U.S. PATENT DOCUMENTS 7,342,897 B1   3/2008   Nader et al.
7,978,601 B1   7/2011   Croak et al.
(Continued)

OTHER PUBLICATIONS

Communication Pursuant to Rule 71 (3) Received for European Application No. 21727654.2, mailed on Nov. 17, 2023, 09 pages.
(Continued)

*Primary Examiner* — Duyen M Doan
(74) *Attorney, Agent, or Firm* — Ray Quinney & Nebeker P.C.; James S. Bullough

(57) ABSTRACT

A network verification system uses general-purpose programming language to create network verification tests. A test orchestrator builds a model of the network only using data from the network verification test. An optimization testing manager creates symbolic packets for verification
(Continued)

tests using assertions based on a packet library embedded into the testing manager and the general-purpose programming language.

20 Claims, 8 Drawing Sheets

Related U.S. Application Data

(60) Provisional application No. 63/055,812, filed on Jul. 23, 2020.

(56) References Cited

U.S. PATENT DOCUMENTS

| | | | |
|---|---|---|---|
| 8,611,219 B2 | 12/2013 | Golic | |
| 9,929,915 B2 | 3/2018 | Erickson et al. | |
| 10,686,671 B1* | 6/2020 | Mozumdar | H04L 41/12 |
| 2014/0026123 A1* | 1/2014 | Dhanapal | G06F 11/3664 |
| | | | 717/124 |
| 2016/0373334 A1 | 12/2016 | Gintis et al. | |
| 2017/0155569 A1 | 6/2017 | Chinnaswamy et al. | |
| 2018/0375730 A1 | 12/2018 | Anand et al. | |
| 2019/0044790 A1* | 2/2019 | Dickens | H04L 41/069 |
| 2019/0334807 A1 | 10/2019 | Clark et al. | |
| 2020/0067788 A1* | 2/2020 | Thakkar | H04L 41/12 |
| 2020/0106676 A1 | 4/2020 | Duda et al. | |

OTHER PUBLICATIONS

European Decision to Grant for European Application No. 21727654. 2, dated Mar. 21, 2024, 2 pages.
"Notice of Allowance Issued in U.S. Appl. No. 17/115,379", Mailed Date: May 13, 2021, 10 Pages.
Anderson, et al., "NetKat: Semantic Foundations for Networks", In Proceedings of the 41st ACM SIGPLAN-SIGACT Symposium on Principles of Programming Languages, Jan. 22, 2014, pp. 113-126.
Armstrong, et al., "Challenges in the Automatic Parallelization of Large-scale Computational Applications", In Commercial Applications for High-Performance Computing, Jul. 27, 2001, 11 Pages.
Beckett, et al., "A General Approach to Network Configuration Verification", In Proceedings of the Conference of the ACM Special Interest Group on Data Communication, Aug. 21, 2017, pp. 155-168.
Beckett, et al., "Don't Mind the Gap: Bridging Network-wide Objectives and Device-level Configurations", In Proceedings of the ACM SIGCOMM Conference, Aug. 22, 2016, pp. 328-341.
Beckett, et al., "Network Configuration Synthesis with Abstract Topologies", In Proceedings of the 38th ACM SIGPLAN Conference on Programming Language Design and Implementation, Jun. 18, 2017, pp. 437-451.
Beckett, et al., "Putting Network Verification to Good Use", In Proceedings of the 18th ACM Workshop on Hot Topics in Networks, Nov. 13, 2019, pp. 77-84.
Bjørner, et al., "ddNF: An Efficient Data Structure for Header Spaces", In Haifa Verification Conference, Nov. 14, 2016, 16 Pages.
Brace, et al., "Efficient Implementation of a BDD Package", In Proceedings of 27th ACM/IEEE Design Automation Conference, Jun. 24, 1990, pp. 40-45.
Bryant, Randal E., "Chain Reduction for Binary and Zero-suppressed Decision Diagrams", In Repository of arXiv:1710. 06500v1, Oct. 17, 2017, pp. 1-21.
Canini, et al., "A Nice Way to Test OpenFlow Applications", In Proceedings of the 9th USENIX Conference on Networked Systems Design and Implementation, Apr. 25, 2012, 14 Pages.
Dobrescu, et al., "Software Dataplane Verification", In Proceedings of 11th USENIX Symposium on Networked Systems Design and Implementation, Apr. 2, 2014, pp. 101-114.
El-Hassany, et al., "NetComplete: Practical Network-Wide Configuration Synthesis with Autocompletion", In Proceedings of 15th USENIX Symposium on Networked Systems Design and Implementation, Apr. 9, 2018, pp. 579-594.
El-Hassany, et al., "Network-Wide Configuration Synthesis", In Repository of arXiv:1611.02537v1, Nov. 8, 2016, pp. 1-30.
Fayaz, et al., "Efficient Network Reachability Analysis Using a Succinct Control Plane Representation", In Proceedings of 12th USENIX Symposium on Operating Systems Design and Implementation, Nov. 2, 2016, pp. 217-232.
Fogel, et al., "A General Approach to Network Configuration Analysis", In Proceedings of the 12th USENIX Symposium on Networked Systems Design and Implementation, May 4, 2015, pp. 469-483.
Gember-Jacobson, et al., "Fast Control Plane Analysis Using an Abstract Representation", In Proceedings of the ACM SIGCOMM Conference, Aug. 22, 2016, pp. 300-313.
Gomes, et al., "Vericonn: A Tool to Generate Efficient Interconnection Networks for Post-silicon Debug", In Proceedings of 16th Latin-American Test Symposium, Mar. 25, 2015, 6 Pages.
Hardcastle, Jessica Lyons, "VMware Buys Veriflow for Network Monitoring, Verification", Retrieved from: https://www.sdxcentral.com/articles/news/vmware-buys-veriflow-for-network-monitoring-verification/2019/08/, Aug. 16, 2019, 5 Pages.
Horn, et al., "Delta-net: Real-time Network Verification using Atoms", In Proceedings of 14th USENIX Symposium on Networked Systems Design and Implementation, Mar. 27, 2017, pp. 735-749.
Jayaraman, et al., "Validating Datacenters at Scale", In Proceedings of the ACM Special Interest Group on Data Communication, Aug. 19, 2019, pp. 200-213.
Kazemian, et al., "Header Space Analysis: Static Checking for Networks", In Proceedings of the 9th USENIX Conference on Networked Systems Design and Implementation, vol. 12, Apr. 25, 2012, 14 Pages.
Kazemian, et al., "Real Time Network Policy Checking Using Header Space Analysis", In Proceedings of the 10th USENIX Conference on Networked Systems Design and Implementation, Apr. 2, 2013, 13 Pages.
Khurshid, et al., "VeriFlow: Verifying Network-wide Invariants in Real Time", In Proceedings of the 10th USENIX Symposium on Networked Systems Design and Implementation, Apr. 2, 2013, pp. 15-27.
Liu, et al., "p4v: Practical Verification for Programmable Data Planes", In Proceedings of the Conference of the ACM Special Interest Group on Data Communication, Aug. 20, 2018, pp. 490-503.
Long, David E., "The Design of a Cache-Friendly BDD Library", In Proceedings of the IEEE/ACM International Conference on Computer-aided Design, Nov. 1, 1998, pp. 639-645.
Lopes, et al., "Checking Beliefs in Dynamic Networks", In Proceedings of 12th USENIX Symposium on Networked Systems Design and Implementation, May 4, 2015, pp. 499-512.
Lunden, Ingrid, "Forward Networks Raises $35M to Help Enterprises Map, Track and Predict their Networks' Behavior", Retrieved from: https://techcrunch.com/2019/10/08/forward-networks-raises-35m-to-help-enterprises-map-track-and-predict-their-networks-behavior/, Oct. 8, 2019, 2 Pages.
Mai, et al., "Debugging the Data Plane with Anteater", In Proceedings of the ACM SIGCOMM Conference, Aug. 15, 2011, pp. 290-301.
Panda, et al., "Verifying Reachability in Networks with Mutable Datapaths", In Proceedings of the 14th USENIX Symposium on Networked Systems Design and Implementation, Mar. 27, 2017, pp. 699-718.
Zhu, et al., "Packet-Level Telemetry in Large Datacenter Networks", In Proceedings of the ACM Conference on Special Interest Group on Data Communication, Aug. 17, 2015, pp. 479-491.
Scudder, et al., "BGP Monitoring Protocol (BMP)", Retrieved from: https://www.rfc-editor.org/rfc/rfc7854.html, Jun. 2016, 27 Pages.
Soulé, et al., "Merlin: A Language for Provisioning Network Resources", In Proceedings of the 10th ACM International on Conference on Emerging Networking Experiments and Technologies, Dec. 2, 2014, pp. 213-225.

(56) References Cited

OTHER PUBLICATIONS

Stoenescu, et al., "Debugging P4 Programs with Vera", In Proceedings of the Conference of the ACM Special Interest Group on Data Communication, Aug. 20, 2018, pp. 518-532.

Sung, et al., "Robotron: Top-down Network Management at Facebook Scale", In Proceedings of the ACM SIGCOMM Conference, Aug. 22, 2016, pp. 426-439.

Xie, et al., "On Static Reachability Analysis of IP Networks", In Proceedings IEEE 24th Annual Joint Conference of the IEEE Computer and Communications Societies, vol. 3, Mar. 13, 2005, pp. 1-15.

Yang, et al., "Real-time Verification of Network Properties using Atomic Predicates", In Journal of IEEE/ACM Transactions on Networking, vol. 24, Issue 2, Apr. 2016, pp. 887-900.

Zeng, et al., "Automatic Test Packet Generation", In Proceedings of the 8th International Conference on Emerging Networking Experiments and Technologies, Dec. 10, 2012, pp. 241-252.

Zeng, et al., "Libra: Divide and Conquer to Verify Forwarding Tables in Huge Networks", In Proceedings of 11th USENIX Symposium on Networked Systems Design and Implementation, Apr. 2, 2014, pp. 87-99.

U.S. Appl. No. 17/115,379, filed Dec. 8, 2020.

Li, et al., "A Survey on Network Verification and Testing With Formal Methods: Approaches and Challenges", In Journal of IEEE Communications Surveys & Tutorials, vol. 21, Issue 1, Feb. 22, 2019, pp. 940-969.

Liu, et al., "CrystalNet: Faithfully Emulating Large Production Networks", In Proceedings of the 26th Symposium on Operating Systems Principle, Oct. 28, 2017, pp. 599-613.

Marchetto, et al., "A Framework for Verification-Oriented User-Friendly Network Function Modeling", In Journal of IEEE Access, vol. 7, Aug. 7, 2019, pp. 99349-99359.

"International Search Report & Written Opinion Issued in PCT Application No. PCT/US21/030028", Mailed Date: Jul. 2, 2021, 11 Pages.

Song, Jaeseung, "SymbexNet: Checking Network Protocol Implementations using Symbolic Execution", In Thesis of Imperial College London, Feb. 2013, 150 Pages.

Yuan, et al., "NetSMC: A Custom Symbolic Model Checker for Stateful Network Verification", In Proceedings of 17th USENIX Symposium on Networked Systems Design and Implementation, Feb. 25, 2020, 20 Pages.

\* cited by examiner

NETWORK VERIFICATION SYSTEMS AND METHODS

BACKGROUND

Computing networks may be formed from many computing devices, virtual machines, applications, and so forth. Computing networks are often connected over the internet (e.g., a cloud computing network). The different devices may communicate with other devices and/or applications in the network or outside of the network. Some devices and/or applications may be located in different geographical locations, including different server racks, different rooms, different buildings, different cities, different countries, and different continents, but may retain communication pathways over the internet.

As the size of a computing network increases, changes to the structure and/or operation of the computing network may not work as intended or may have unintended consequences. For example, a developer may make a change to a virtual machine that is along a communication pathway from a start point to an end point. However, this change may result in the virtual machine not being able to pass data packets along the communication pathway. This may result in data packets that are unable to travel from the start point to the end point, or that may need to travel along a longer pathway from the start point to the end point, thereby increasing latency. Network changes may result in many different problems, including communication loops and application malfunctions.

To detect and correct these network problems, developers perform network verification. Before a developer implements a change to the network, the developer may check how these changes will affect the network. Conventionally, network verification involves replicating the entire network and implementing the change on the replicated network. Replicating the network is resource intensive, and impractical for large-scale cloud computing networks. Furthermore, implementing the change in a replicated network may include implementing a change over a vast number of operations and communication pathways, requiring extensive time and processing resources.

Furthermore, conventional verification mechanisms may analyze a network with static analysis. A static analysis pushes a representative set of packets through the network to observe how the network will transform the packets hop by hop. However, conventional verification mechanisms are limited in their versatility. For example, verification mechanisms may analyze arbitrary graph properties but may do so by extensive preprocessing of the network to determine network characteristics.

SUMMARY

In accordance with one aspect of the present disclosure, a method is disclosed for verifying a change to a network. The method includes receiving a network change to be implemented on the network. The network change affects transfer of data packets through the network. The method also includes receiving a network verification test including test parameters. The test parameters include one or more invariants. The one or more invariants include a condition for the transfer of the data packets through the network. The network verification test tests the transfer of the data packets and identifies network elements used by the data packets affected by the network change. The method also includes retrieving network data from the network elements identified by the test parameters. The method also includes building a representation of the network from the network data on which to run the network verification test. The representation of the network includes representations of the network elements identified by the test parameters. The representation of the network is configured to transfer simulated data packets across the network elements. The method also includes applying the network verification test to the representation of the network data to determine whether the condition included in the one or more invariants is satisfied.

The network data may include at least one of network topology, device metadata, IP addressing information, routing tables, or device configurations.

Applying the network verification test may include testing at least one element of the network data.

Building the representation of the network may include building the representation of the network only from the network data.

The network verification test may be written in a general-purpose programming language.

The network verification test may be separate from the representation of the network.

The method may further include preparing a test report including results of the network verification test.

The test report may include results from each element of the network verification test.

Receiving the network verification test may include identifying the test parameters from the network verification test.

Building the representation of the network may include generating a network graph of the network.

In accordance with another aspect of the present disclosure, a method is disclosed for verifying a change to a network. The method includes receiving a network change to be implemented on the network. The network change affects transfer of data packets through the network. The method also includes receiving a network verification test. The method also includes identifying test parameters from the network verification test. The test parameters include one or more invariants. The one or more invariants include a condition for the transfer of the data packets through the network. The network verification test tests the transfer of the data packets and identifies network elements used by the data packets affected by the network change. The method further includes generating a symbolic packet using an equivalence class for a plurality of data packets. The equivalence class correlates the plurality of data packets based on a similar data packet trait used to test the condition of the one or more invariants. The method also includes applying the network verification test on a representation of the network generated using the identified network elements using the symbolic packet.

The method may further include identifying a packet assertion of a packet type in the network verification test. Generating the symbolic packet may include evaluating the packet assertion based on a packet library of symbolic data types.

Generating the symbolic packet may include creating an abstract syntax tree based on the packet assertion and analyzing the abstract syntax tree with a binary decision diagram.

Generating the symbolic packet may further include generating a network graph based on the packet assertion.

The method may further include identifying a test assertion in the network verification test and applying the test assertion to the symbolic packet.

In accordance with another aspect of the present disclosure, a network verification system is disclosed that includes one or more processors, memory in electronic communication with the one or more processors, and instructions stored in the memory. The instructions are executable by the one or more processors to receive a network change to be implemented on a network. The network change affects transfer of data packets through the network. The instructions are also executable by the one or more processors to receive a network verification test. The instructions are also executable by the one or more processors to identify test parameters from the network verification test. The test parameters include one or more invariants. The one or more invariants include a condition for the transfer of data packets through the network. The network verification test tests the transfer of data packets and identifies network elements used by the data packets affected by the network change. The instructions are also executable by the one or more processors to retrieve network data from the network elements identified by the test parameters. The instructions are also executable by the one or more processors to build a representation of the network from the network data on which to run the network verification test. The representation of the network includes representations of the network elements identified by the test parameters. The representation of the network is configured to transfer simulated data packets across the network elements. The instructions are also executable by the one or more processors to generate a symbolic packet using an equivalence class for a plurality of data packets. The equivalence class correlates the plurality of data packets based on a similar data packet trait used to test the condition of the one or more invariants. The instructions are also executable by the one or more processors to apply the network verification test to the symbolic packet to determine whether the condition included in the one or more invariants is satisfied.

The network verification test may be written in a general-purpose programming language.

The network verification test may be separate from the representation of the network.

Generating the symbolic packet may include creating an abstract syntax tree based on a packet assertion in the network verification test and analyzing the abstract syntax tree with a binary decision diagram.

Generating the symbolic packet may include creating an abstract syntax tree based on a packet assertion in the network verification test and analyzing the abstract syntax tree with a binary decision diagram.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description that follows. Features and advantages of the disclosure may be realized and obtained by means of the systems and methods that are particularly pointed out in the appended claims. Features of the present disclosure will become more fully apparent from the following description and appended claims, or may be learned by the practice of the disclosed subject matter as set forth hereinafter.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. Understanding that the drawings depict some example embodiments, the embodiments will be described and explained with additional specificity and detail through the use of the accompanying drawings in which.

DETAILED DESCRIPTION

Figure 1:
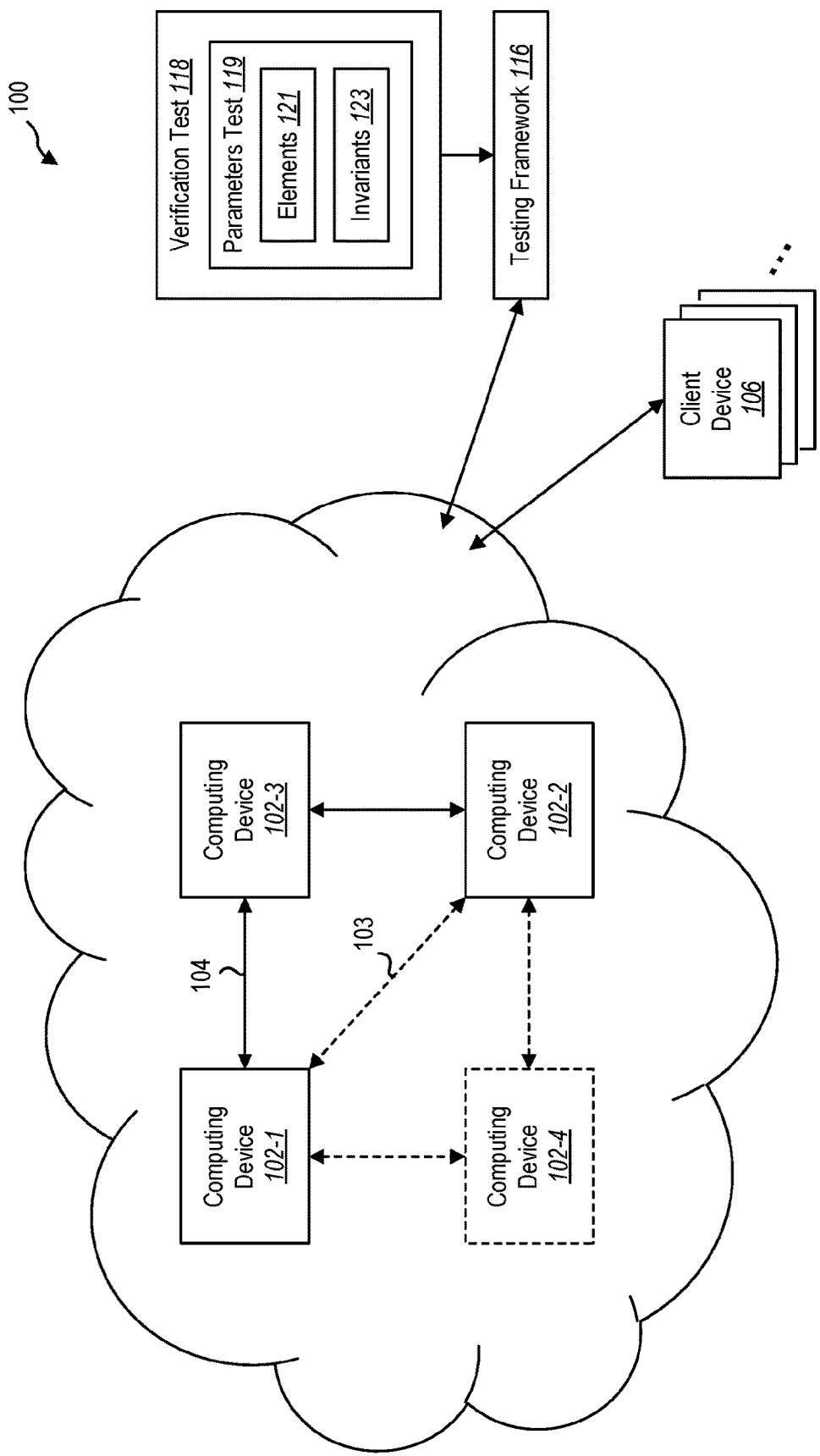
FIG. 1 is a representation of a network, according to at least one embodiment of the present disclosure.

This application relates to devices, systems, and methods for optimized network verification testing. A network engineer, developer, or other user may develop a verification test, using a general-purpose programming language such as C #. To determine which input data to use, a test orchestrator may review the verification test to identify which aspect of the network the verification test will test. To perform network verification testing, a test orchestrator builds a model of the target network. The test orchestrator may build the model from many different types of input data, which may be identified from the network verification test, such as topology, device metadata, IP addressing information, device configurations, routing tables, and so forth. After the test orchestrator builds the model, the model performs verification using any testing framework, such as static or concrete analysis and/or symbolic verification.

At least one verification mechanism supports the creation of a symbolic packet based on an equivalence class. The testing framework may generate the equivalence class. The testing framework may run concrete, network engineer-defined tests on the symbolic packet, rather than every possible data packet. By running the tests on symbolic packets, a network engineer may create more exhaustive tests (e.g., tests that test more packets than would otherwise be possible by testing every possible data packet). A more exhaustive test, if passed, would increase the network engineer's confidence that the proposed change to the network is safe to deploy (e.g., that the proposed change will not create problems within the network).

The present disclosure includes a number of practical applications that provide benefits and/or solve problems associated with network verification. For example, as will be discussed in further detail herein, systems described herein perform network verification using a framework that allows a network engineer to draft verification tests in a descriptive programming language such as C # without adjusting the testing framework. This reduces the amount of time it takes to formulate a test, thereby improving the versatility of the framework. This further reduces the cost and processing resources of developing verification tests. In this manner, the number of verification tests may be increased for the same time period and/or budget, resulting in more reliable networks.

In another example, as will be described further herein, the test orchestrator may generate a model of the network that only analyses the behavior designated by the verification test, such as through test assertions in the verification test. This reduces the size of the model and reduces the processing resources required to run the model. In this manner, the model is tailored to the needs of the developer, without wasting resources on unnecessary elements. Put another way, the test orchestrator may generate a tailored representation of the network that focuses on the elements of the network verification test and/or the network change to be tested. Tailoring the representation to the details of the network verification test and/or the network change may reduce the processing requirements of the representation.

As illustrated in the foregoing discussion, the present disclosure utilizes a variety of terms to describe features and advantages of a device management system within a variety of computing environments. Additional detail will now be provided regarding the meaning of such terms. For example, as used herein, a "network" is a collection of computing devices, both physical and virtual, connected such that each computing device may communicate with other computing devices in the network. Network devices may be connected over any type of communication network, including a local area network (LAN) or a wide area network (WAN). Network devices may communicate directly (i.e., device to device), or indirectly (i.e., through at least one intermediate device). A network may be connected to the internet.

As used herein, "verifying" or "verification" is a process to determine that a network is functioning as intended, or that a given invariant is satisfied. To verify a network, a network engineer may develop a test to determine whether a given invariant remains true. For example, the network engineer may wish to test an invariant related to reachability, or connectivity between a start point and an end point in the network. The network engineer may verify reachability by determining that a data packet may travel between the start point and the end point. The network engineer may further specify a required maximum number of "hops" (e.g., connections between computing devices) for a data packet to travel between the start point and the end point.

As used herein, a "test parameter" is any parameter or network property included in a network test to verify network functionality. For example, test parameters may include information about network elements, such as network topology, routing node information, routing conditions, bandwidth limitations, and so forth. Test parameters may further include information about data packets that travel through the network, such as size, content, redundancy, origin, destination, route path, security, identifiers, and so forth. As discussed herein, test parameters may be used to develop a network representation of the network on which to perform a network test. Test parameters may be used to develop a symbolic packet, representative of multiple similar data packets, that may be used to analyze the network. When a developer or network engineer prepares a network verification test, he or she may prepare the test to include specific test parameters that correlate to specific network elements that will be affected by the network change, and therefore are needed to be tested by the network test. When the test orchestrator prepares a representation of the network, the test orchestrator may identify the test parameters, and use them to retrieve the specific network elements.

As used herein, an "invariant" is a network property that should remain true during operation of the network. In accordance with embodiments of the present disclosure, an invariant may be included as part of a network verification test. The invariant may include, set, or otherwise define a condition for the transfer of data packets through the network. For the invariant to be met, the condition must be true. For example, an invariant of reachability may have a condition that requires that a packet may travel between a start node and an end node. Other examples of invariants have conditions such as no loops (e.g., a packet does not travel through the same node more than once) and maximum number of hops (e.g., a packet may travel through no more than 4 nodes between the start and end point). Invariants may include conditions that relate to any other network variable, including network functionality, network communication path, application functionality, and so forth.

As used herein, a "forwarding table" includes forwarding information about the path a packet may travel through a network. In accordance with embodiments of the present disclosure, a forwarding table is a table of rules that specify, for any given packet entering a network node (e.g., a router), what neighboring network node the packet will be sent to. In aggregate, the forwarding tables across many devices will determine the path a packet may travel through the network. In some embodiments, a forwarding table may include data local to a specific network node or router, rather than the entire path the packet may take through the network.

As used herein, an "equivalence class" is a grouping of items according to common elements. For example, an equivalence class of packets may be summarized by IP prefixes that help identify start points, end points, or other pathway information. This helps sort the packets into groups that will have the same forwarding behavior throughout the network. Thus, in some examples, an equivalence class may be a class that has a group of packets containing common routing details such that the packets may perform similarly in the network.

Referring now to the figures, FIG. 1 is a representation of a cloud computing network 100, according to at least one embodiment of the present disclosure. The network 100 may include a plurality of computing devices (collectively 102). The computing devices 102 may be in communication with each other. For example, the computing devices 102 may send data packets 104 between each other. In some embodiments, each computing device 102 may be in direct communication with all of the other of the plurality of computing devices 102. In some embodiments, a first computing device 102-1 may be in indirect communication with a second computing device 102-2. For example, the first computing device 102-1 may send a data packet 104 to a third computing device 102-3 which may send the data packet 104 to the second computing device 102-2.

One or more client devices 106 may connect to the network 100. The one or more client devices 106 may receive the data packets 104 from one or more of the computing devices 102 in the network 100. In some situations, the one or more client devices 106 may be located in a different physical location from the computing devices 102 on the network 100. Thus, the client device 106 may access the network via the internet. In some situations, the computing devices 102 may be geographically separated and connected by the internet. Thus, the network 100 may be a virtual network, or a cloud network.

Modern networks may involve millions or even billions of computing devices, and any change to the network may result in a change to the communication pathway between two computing devices 102. For example, a fourth computing device 102-4 may be added to the network 100 in communication with the first computing device 102-1 and the second computing device 102-2. This may add a new communication pathway between the first computing device 102-1 and the second computing device 102-2. In some examples, the number of computing devices 102 may remain the same, but a new communication pathway 103 may be opened between the first computing device 102-1 and 102-2.

When contemplating a network change (such as by adding new computing device 102-4 and/or adding the new communication pathway 103), a network engineer may desire to test the change to see how the change will affect network. The network engineer may develop a verification test 118 using a general-purpose programming language such as C #. A testing framework 116 may include a library of assertions associated with the general-purpose programming language. Using test parameters identified from assertions and other elements of the verification test 118, the testing framework 116 may build a representation of a network and perform the verification test 118.

The network engineer may include one or more test parameters 119 in the verification test 118 using assertions associated with the general-purpose programming language. For example, the network engineer may wish to determine whether there is a direct pathway between the first computing device 102-1 and the second computing device 102-2. The test parameters 119 for this verification test 118 may include the first computing device 102-1 and the second computing device 102-2 as network elements 121. The test parameters 119 may further include an invariant 123 with a condition of a single hop between the first computing device 102-1 and the second computing device 102-2.

The testing framework 116 may identify the network elements 121 and the invariant 123 from the verification test 118. Using the network elements 121, the testing framework 116 may collect the relevant network data from the network 100. For example, the testing framework 116 may collect the relevant information for the first computing device 102-1, the second computing device 102-2, and any communication routes between them. The testing framework 116 may then build a representation of the network using the network elements 121. The testing framework 116 may then apply the verification test 118 to the representation of the network to see if the invariant 123 is satisfied.

In this manner, the network engineer may develop a customized verification test 118 to test the changes to the network. Because the network test is written using a general-purpose programming language, the network test is easy to customize. This may allow the network engineer to test both small and large changes to the network. Furthermore, writing the network test in a general-purpose programming language may allow the network engineer to focus her test on invariants specific to the network change.

Figure 2:
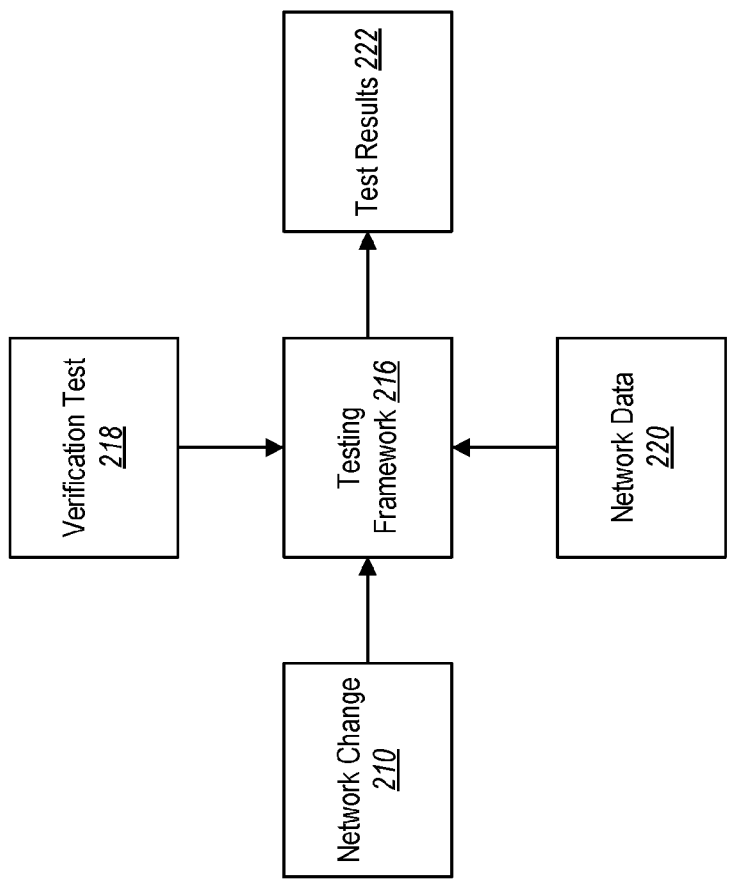
FIG. 2 is a representation of a network verification system, according to at least one embodiment of the present disclosure.

FIG. 2 is a representation of a network verification system 208, according to at least one embodiment of the present disclosure. During the administration of a network, a network engineer and/or network administrator may desire to implement a network change 210 to the network. The network change 210 may be any type of change, including changes to routing pathways, changes to network topology, changes to network infrastructure (e.g., adding, removing, and/or consolidation of computing devices), changes to network applications, changes to network element addresses based on splitting or consolidation of network elements, and so forth.

In some embodiments, the network verification system 208 may run an initial network test on the network using the verification test. The initial network test may include a network simulator to simulate network behavior. Additionally, or alternatively, the network test may include an emulator that may develop routing tables for the emulated network based on the network change 210.

Because the network change 210 may affect operation of the network, a network engineer may wish to test the network to determine if the network change 210 is operating as intended and/or if the network change 210 has impacted (adversely or positively) any other element of the network. To test the effects of the network change 210, the network engineer may develop a verification test 218 using a general-programming language, as described above with reference to the verification test 118 of FIG. 1. Using test parameters included in the verification test 218, the testing framework 216 may build a representation of the network. The testing framework 216 may run the verification on the representation of the network.

To build the model, the testing framework 216 may identify the test parameters from the network verification test 218. For example, the testing framework may identify one or more network elements that are relevant to the verification test 218. Using these network elements, the testing framework 216 may identify network data to use to develop the representation of the network. The testing framework 216 may retrieve the network data 220 and, using the retrieved network data 220, may build the representation of the network. The network data 220 may include any network data used to build a model network, including network topology, device metadata, IP addressing information, routing tables, device configurations, and so forth.

In accordance with embodiments of the present disclosure, the testing framework 216 may retrieve only the network data 220 that is relevant to the test parameters identified in the verification test. For example, using the network described above with respect to FIG. 1, the verification test 218 may be testing direct connectivity between a first computing device 102-1 and a second computing device 102-2. The testing framework 216 may identify the test parameters 119 from the verification test 218. From those test parameters 119, the testing framework 216 may identify network elements 121, including the first computing device 102-1, the second computing device 102-2, and the communication pathway 103.

To test direct communication between the first computing device 102-1 and the second computing device 102-2, the testing framework 216 may only collect network data 220 relevant to the first computing device 102-1, the second computing device 102-2, and the communication pathway 103. The representation of the network may then only include the collected network data 220 (e.g., the first computing device 102-1, the second computing device 102-2, and the communication pathway 103). In other words, the representation of the network may not include network data 220 not related to the test, such as the third computing device. This may reduce the size of the representation of the network and/or the processing requirements of the representation of the network. This may reduce the time and money used to test the network change 210.

The testing framework 216 may execute the network verification test 218 on the model network and produce a test report 222. The test report 222 may include the results of each element of the network verification test 218, including pass/fail information. The network engineer may then use the test report 222 to identify and fix any problems in the network.

Figure 3:
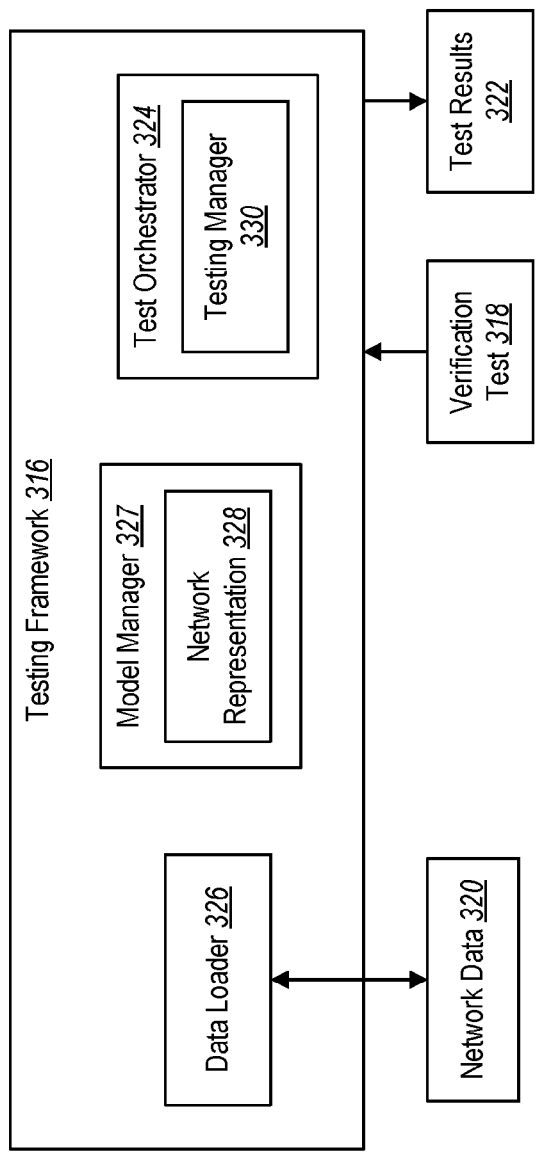
FIG. 3 is a representation of a testing framework, according to at least one embodiment of the present disclosure.

FIG. 3 is a representation of a testing framework 316, according to at least one embodiment of the present disclosure. During network verification, a network engineer may input a verification test 318 into the testing framework 316. The testing framework may analyze the verification test 318, build a representation of the network 328, and run the verification test 318. The testing framework 316 may output test results 322 of the verification test 318 for analysis by the network engineer or network administrator.

The test results 322 may include any results from the execution of the verification test 318. For example, the test results 322 may include a simple report of the satisfaction of specific invariants. In some embodiments, the test results 322 may include analytical information. For example, if a network invariant has a condition of "no more than four hops between an origin and a destination, the test results 322 may include statistics on the number of hops, such as average, median, maximum, minimum, the forwarding graph of any given data packet, any other network statistics, and combinations thereof. The network engineer may then use the test results 322 to adjust the network. For example, the network engineer may use the test results 322 to adjust a network change prior to implementation. In some examples, a network engineer may use the test results 322 as a basis for a future network change.

The testing framework 316 may receive the verification test 318 from the network engineer. The testing framework 316 may analyze the verification test 318. In some embodiments, the testing framework 316 may identify test parameters (e.g., test parameters 119 of FIG. 1) included in the verification test 318. The testing framework 316 may then distribute the relevant identified test parameters to a data loader 326, a model manager 327, and/or a test orchestrator 324, as appropriate.

In some embodiments, each element of the testing framework 316 may analyze the verification test 318 separately and identify the relevant test parameters. For example, the test orchestrator 324 may identify invariants (e.g., invariants 123 of FIG. 1) of the test parameters for use in executing a network verification test. In some examples, the model manager 327 may identify network elements (e.g., network elements 121 of FIG. 1) of the test parameters for use in building a representation of the network 328. In some examples, the data loader 326 may identify network elements of the test parameters to determine network data 320 to be collected from the network for use in building the representation of the network 328.

In some embodiments, the data loader 326 may identify one or more test parameters from the verification test 318. For example, the data loader 326 may identify at least one network element (e.g., network elements 121 of FIG. 1) from the verification test 318. In some examples, the data loader 326 may identify communication pathways, routing tables, or other network elements from the verification test 318. Using the at least one network element, the data loader 326 may identify relevant information used to build a representation of the network 328. In some embodiments, the data loader 326 may receive the at least one network element from another source, such as the testing framework 316 generally, the model manager 327, and/or the test orchestrator 324.

The data loader 326 may be in communication with the network (e.g., the network 100 of FIG. 1). For example, the data loader 326 may have access to the network topology. The data loader may retrieve network data 320 from the network that is relevant to build the representation of the network 328. For example, based on the network change embodiment described with respect to FIG. 1, the data loader 326 may retrieve network data 320 related to the first computing device 102-1, the second computing device 102-2, and the communication pathway 103. In some embodiments, the data loader 326 may only collect the relevant network data 320, rather than all of the network data 320 for the entire network. The data loader 326 may then provide the relevant network data 320 to the model manager 327.

In accordance with embodiments of the present disclosure, the model manager 327 may build a representation of the network 328 on which to implement the network verification test developed by the testing manager 330. The model manager 327 may receive the network data 320 from the data loader 326. The model manager 327 may then utilize the network data 320 to build a representation of the network 328. In some embodiments, the representation of the network 328 may include limited functionality of the network. For example, the representation of the network 328 may be able to simulate the pathway that one or more data packets may take through the representation of the network. Put another way, a simulated data packet may include metadata, such as packet size and/or routing information (e.g., travel from and origin of the first computing device 102-1 to a destination of the second computing device 102-2). Based on the identified test parameters and the collected network data 320, the representation of the network 328 may include sufficient detail to simulate the behavior of the simulated data packet in the network.

In accordance with embodiments of the present disclosure, the testing framework 316 may include a test orchestrator 324. The test orchestrator 324 may manage the execution of the network verification test 318. As described herein, in some embodiments, the test orchestrator 324 may analyze the verification test 318 and one or more test parameters, such as one or more invariants.

The test orchestrator 324 may include a testing manager 330 that may execute the network verification test on the representation of the network 328. In some embodiments, as discussed herein, the testing manager 330 may include a packet library of packet assertions. The verification test 318 may include one or more assertions of conditions to be tested written in a general-purpose programming language. The testing manager 330 may be able to read the general-purpose programming language and associate the assertions in the verification test 318 with the packet assertions in the packet library. In this manner, the testing manager 330 may be able to develop a network verification test that can be implemented on the representation of the network 328 using the assertions written in the general-purpose programming language. This may increase the versatility of network verification by allowing a network engineer to develop a customized network verification test to test any desired network feature or change.

In some embodiments, the testing manager 330 may execute or implement the network verification test on the network representation 328. The testing manager 330 may input the network verification test it developed to use on the representation of the network 328 into the representation of the network 328. The testing manager 330 may then collect and analyze the results of the network verification test and prepare the test results 322 for the network engineer.

To implement the network verification test on the representation of the network 328, the testing manager 330 may develop simulated test packets having characteristics that may be used to test the conditions of the invariants of the test parameters. For example, using the example change shown in FIG. 1, a simulated test packet may have a source IP address of the first computing device 102-1 and a destination IP address of the second computing device 102-2. The testing manager 330 may run the simulated data packet through the network representation 328. The testing manager 330 may then follow the path that the simulated data packet takes through the network representation. The testing manager 330 may analyze the path taken (and other data related to the travel of the simulated data packet through the network representation 328) to see if the data path taken satisfies the condition of the invariant.

In some embodiments, the simulated data packet is developed using the invariants identified in the test parameters. For example, the test parameters may include an invariant of a single hop between the first computing device 102-1 and the second computing device 102-2. Based on the assertions that include the invariant, the testing manager may develop a simulated data packet that has a source IP address of the first computing device 102-1 and a destination IP address of the second computing device 102-2. Furthermore, based on the assertions that include the invariant of a single hop between the computing devices, the testing manager 330 may track the path of the simulated data packet to determine whether it satisfies the conditions of the invariant.

While embodiments of the present disclosure have been described with reference to a verification test 318 that includes single invariant involving a single hop between the two computing devices, it should be understood that a verification test 318 may include any number of invariants of any level of complexity. In this manner, a single simulated data packet may be generated by the testing manager 330 to run through the network representation 328. However, it should be understood that, based on the assertions used in the verification test 318, any number of simulated data packets having any number of parameters may be generated to implement the network verification test.

Furthermore, and as discussed herein, the testing manager 330 may develop one or more symbolic data packets. A symbolic data packet may be a data packet that is representative of a group of data packets that have similar properties. For example, the simulated data packet described above may be developed as a symbolic data packet for each data packet that travels from the first computing device 102-1 to the second computing device 102-2. In some embodiments, the symbolic data packet may be representative of a first data packet property (e.g., source/destination IP address), but may be agnostic to another data packet property (e.g., data type). This may allow the testing manager 330 to quickly and efficiently test large groups of data packets without testing each individual data packet. This may help to reduce processing resources used while executing a network verification test.

As discussed herein, a network engineer and/or network administrator may create the network verification test 318. This means that the verification test 318 is separate from the testing framework 316. To implement a network verification test, the testing framework 316 uses the verification test 318 to identify test parameters, and build a unique network representation 328 on which to implement a unique network verification test for each verification test 318. As discussed herein, conventional network verification tools utilize custom-built hardware/software implementations that may simulate the entire network and are built with inflexible, hard-coded testing parameters. This makes network verification time and resource intensive. Furthermore, conventional network verification tools may be implemented by a specialized network verification expert, further adding to the cost of network verification.

By making the verification test 318 separate from the network representation 328 and the testing manager 330, a network engineer may develop a verification test tailored to a specific application. This versatility allows the same test orchestrator 324 to use many different verification tests 318 to test the same or different networks. Because the verification test 318 is written external to the testing framework and implemented using the testing manager, a different verification test 318 may be developed without requiring any changes to the internals of the testing framework 316. In other words, a network engineer may change or upload completely new verification tests 318 without modifying the base or source code of the test orchestrator 324 and/or without manually selecting and loading network data 320. This may greatly increase the versatility of the testing framework 316 and decrease the time and processing resources used to execute a network verification test.

To facilitate separating the verification test 318 from the testing framework 316, the network verification test 318 may be written in a general-purpose programming language such as C # or other general-purpose programming language. By writing the network verification test 318 in a general-purpose programming language, a network engineer may write new network verification tests without limiting the expressiveness of the test. In other words, using the general-purpose programming language may allow for multiple testing parameters to be tested (either in a single verification test 318 or in different verification tests 318) without modifying the testing framework 316.

In accordance with embodiments of the present disclosure, the test orchestrator 324 may identify and communicate the test parameters to other elements of the testing framework 316, such as the model manager 327 and/or the data loader 326. Similarly, the test orchestrator 324 receive the test parameters from the verification test 318 from the other elements of the testing framework 316, such as the model manager 327 and/or the data loader 326.

Figure 4:
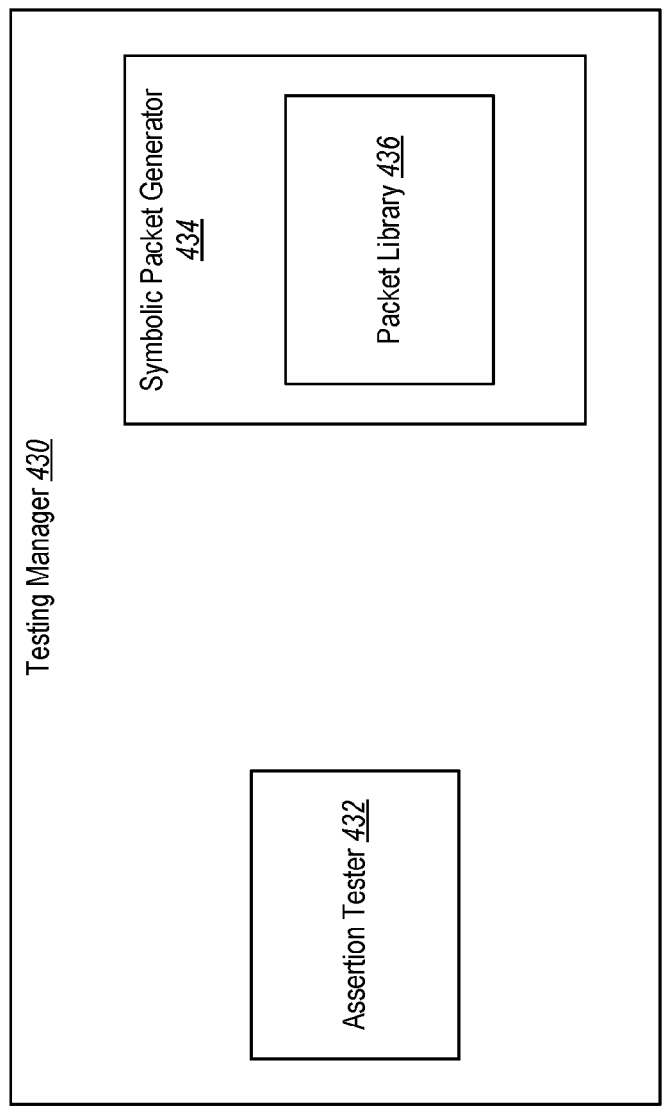
FIG. 4 is a representation of a testing manager, according to at least one embodiment of the present disclosure.

FIG. 4 is a representation of a testing manager 430, according to at least one embodiment of the present disclosure. The testing manager 430 may operate as a part of the test orchestrator (e.g., test orchestrator 324 of FIG. 3). In accordance with embodiments of the present disclosure, the testing manager 430 may analyze a verification test (e.g., verification test 118 of FIG. 1) to identify one or more test parameters (e.g., test parameters 119 of FIG. 1), including one or more invariants (e.g., invariants 123 of FIG. 1). Using the test parameters and the invariants, the testing manager may execute a network verification test to test if the conditions of the invariants are true.

The verification test may identify one or more invariants using a test assertion. The test assertion may be any assertion that identifies a condition of an invariant. For example, and referring again to the example change of FIG. 1, a first test assertion may be an assertion that the first computing device 102-1 is connected to the second computing device 102-2. A second test assertion may be that the connection between the first computing device 102-1 and the second computing device 102-2 is a direct connection (e.g., no intervening hops). The verification test may include any number of test assertions that test any element of the network.

The testing manager 430 may perform the network verification test using the assertion tester 432 in any manner. For example, the testing manager 430 may use concrete testing based on test assertions in a verification test to test the structure of the network, such as the number of rules present in forwarding tables of devices. To perform a concrete test, the assertion tester 432 may pass a data packet (either a real data packet or a simulated data packet, as discussed herein) through the representation of the network (e.g., network representation 328). The assertion tester 432 may track the path of the data packet through the network representation. In some embodiments, the assertion tester 432 may perform a concrete test on any number of data packets. In some embodiments, the data packets run through the assertion tester 432 may have different attributes. In some embodiments, the data packets run through the assertion tester 432 may have the same (or at least partially the same or similar) attributes. Concrete testing may include any number of testing conditions or operations that are included in the verification test. In some embodiments, concrete testing may be a thorough mechanism to test a network change on each data packet.

However, concrete testing may be resource-intensive. Many data packets may share similar attributes, such as source IP address, destination IP address, data type, MAC addresses, any other attribute, and combinations thereof. In some embodiments, the testing manager 430 may optimize testing of multiple packets having similar attributes using symbolic testing. In this manner, a single symbolic data packet may be representative of multiple packets that have the same attributes. The testing manager 430 may run the symbolic packet through the assertion tester 432 using a concrete test. Thus, the testing manager 430, by running a concrete test on a symbolic packet, may combine symbolic testing and concrete testing. This may reduce the amount of processing resources used to perform a network verification test.

To create a symbolic data packet, the testing manager 430 may identify one or more packet assertions in the test parameters. The packet assertions may include the packet information the invariant to be tested. For example, using the example from FIG. 1, the packet assertions may include any packet that has a source IP address of the first computing device 102-1, a destination IP address of the second computing device, and/or any packet that may pass from the first computing device 102-1 to the second computing device 102-2. The symbolic packet generator 434 may then create an equivalence class using the packet assertions. Using the equivalence class, the symbolic packet generator 434 may create a data packet that is symbolic of all packets having those same properties. This symbolic packet may then be tested by the assertion tester 432.

Conventional mechanisms to generate symbolic packets may generate every possible equivalence class for the network. For large networks, this process may be resource-intensive. Furthermore, this process may be unnecessary, because every network verification test may not use each equivalence class. Because the symbolic packet generator 434 generates equivalence classes "on-demand," or based on the test assertions included in the verification test, extra equivalence classes are not generated. This may significantly reduce the processing resources used for verification testing. Furthermore, this makes the network verification system described herein scalable, making it valuable for small and large networks alike.

In some embodiments, the assertion tester 432 may generate one or more forwarding graph based on the symbolic packet. The forwarding graph of the symbolic packet may help a network administrator to analyze the path of the symbolic packet and troubleshoot any problems in the network.

As discussed herein, the network engineer writes a verification test using one or more assertions. To increase the versatility and ease-of-use, the assertions may be made based on a general-purpose programming language. As discussed herein, the testing manager 430 identifies the one or more assertions in the verification test. The symbolic packet generator 434 may compare the assertions from the verification test with a packet library 436. The packet library 436 includes a database of assertions of symbolic data types. In other words, the packet library 436 includes a list of assertions used to identify each type of data packet and/or each network invariant that may be used in the network.

The packet library 436 may further be embedded in the general-purpose language (e.g., C #). In this manner, when the network engineer develops a verification test, he may use expressive language to build invariants without changing the structure of the testing manager 430.

The symbolic packet generator 434 may use the packet library 436 to build a symbolic data packet. For example, the symbolic packet generator 434 may use the conditions on packet groupings in the packet assertions to generate an equivalence class, and build a symbolic data packet based on the equivalence class. In some embodiments, the packet library 436 may allow for the packet assertion of all packets that satisfy a given condition. Packet objects satisfying a certain condition may include expressions such as Not (Condition c), And(Condition c1, Condition c2), Or(Condition c1, Condition c2), If(Condition c1, Condition c2), IfElse(Condition c1, Condition c2, Condition c3), AllowedByAcl(Packet p, Acl acl), MatchesAclLine(Packet p, AclLine 1), Matches(Packet p, PacketMatcher m), AllPaths (Packet p, Func<Path, bool> inv), Reachable(Packet p, ISet<Device> srcs, Device dst), NextHopSet(Packet p, Func<ISet<NextHop>, bool> inv), and Forwarding(packet p, Func<Graph, bool> inv). While examples of packet object conditions have been provided herein, it should be understood that any grouping of any type may be used to create equivalence classes based on the asserted conditions.

Developing a symbolic packet based off of the packet assertion Allpackets, with further assertions, may allow the network engineer to quickly develop an invariant that is tested against every data packet having the given conditions without running a loop through every single packet available. This may help to reduce processing resources. In this manner, the creation of a new symbolic packet is streamlined and the time to generate a new symbolic packet is decreased. In some embodiments, the packet library 436 may be have enough detail to develop any symbolic packet used during network verification.

According to embodiments of the present disclosure, building a verification test by writing packet assertions supported by the packet library 436 may facilitate the creation of a wide variety of invariants. The verification test is written by a network engineer or a network administrator, and is separate from the testing manager 430. In other words, the specific packet assertions used by the symbolic packet generator 434 to build a specific symbolic packet are not built into the testing manager 430. In this manner, the network engineer may quickly and easily customize his verification tests to with any desired packet assertion, without changing the programming or other elements of the testing manager 430. This may improve the versatility of the testing manager 430 while reducing the total processing resources used. Furthermore, this may improve the scalability of the network. For example, a small network verification test may be developed and implemented on a network by writing a small number of packet assertions. However, a large and complex network verification test may be developed and implemented on the same network by writing additional packet assertions and invariants. Because the symbolic packets are generated based on the information included in the packet assertions in the verification test, the symbolic packet generator 434 only generates symbolic packets relevant to the verification test. Similarly, the assertion tester 432 may only test those symbolic packets developed by the symbolic packet generator 434.

Furthermore, using packet assertions supported by the packet library 436, the testing manager 430 may create a symbolic packet that represents an equivalence class of data packets. In some embodiments, the symbolic packet generator may create the symbolic packet by evaluating the packet assertion of the packet type based on the packet library 436 of symbolic packet types. The assertion tester may then use the symbolic packet as a mechanism to analyze many data packets at once based on the conditions set forth in the verification test. Because each data packet in a given equivalence class will have at least some of the same attributes, analyzing the symbolic packet will greatly reduce the number of data packets that the testing manager 430 needs to test, thereby saving significant processing resources.

To create the symbolic packet, the symbolic packet generator may create an abstract syntax tree (AST). The AST may be used to analyze the packet assertion in the verification test. The AST may then be interpreted using a binary decision diagram (BDD). This may result in an arbitrary graph of the network based on the packet assertion in the verification test. The testing manager 430 may then test properties of the network graph using testing parameters (e.g., callbacks) in the verification test. For example, a testing parameter may include reachability (can a packet reach from a start point to an end point) and no loops (are there any loops in the graphs). In some embodiments, the testing manager 430 may generate a graph for each symbolic packet representing each equivalence class to thereby further test sections of the network.

In some embodiments, the testing manager 430 may identify one or more test assertions within the verification test. The test assertions may be used by the assertion tester 432 to analyze the invariants developed by the packet assertions. For example, a test assertion may provide concrete tests against which the testing manager 430 tests all packets with the specified test parameters. In this manner, the testing manager 430 may combine concrete testing by the assertion tester 432 with symbolic testing using symbolic data packets generated by the symbolic packet generator 434. In some embodiments, the test assertion may include one or more concrete tests of the structure of the network.

In some embodiments, the testing manager 430 may allow the combination of both concrete testing and symbolic reasoning testing together. For example, the verification test may include a set of test assertions. The verification test may further specify symbolically which symbolic packets are to be run through concrete tests by the assertion tester 432. The testing manager 430 may generate a symbolic packet corresponding to each equivalence class and execute the concrete test on the symbolic packet. Thus, the symbolic reasoning test may optimize the testing process by reducing the total number of packets that need to be run through the concrete tests, thereby reducing the processing requirements of the testing manager 430.

Figure 5:
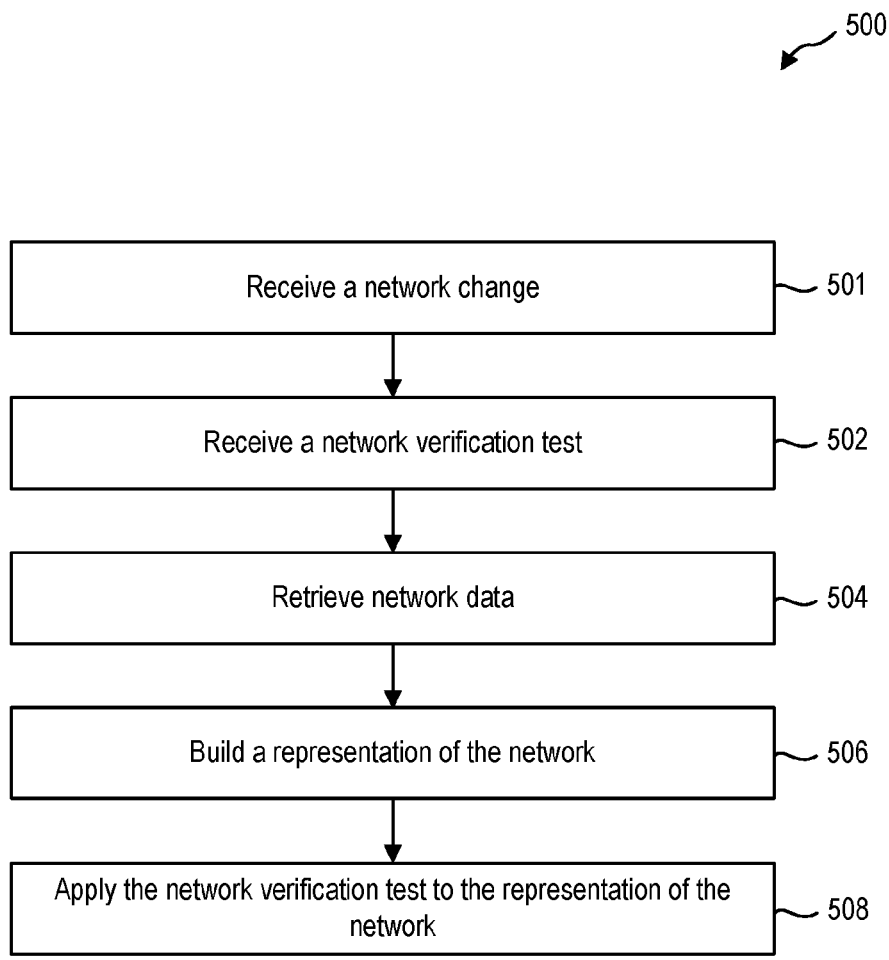
FIG. 5 is a representation of a method for verifying a network, according to at least one embodiment of the present disclosure.

FIG. 5 is a representation of a method 500 for verifying a network, according to at least one embodiment of the present disclosure. The method 500 may be implemented using the testing framework 316 of FIG. 3. In other words, the testing framework 316 may implement the acts and steps of the method 500.

The method 500 may include receiving 501 a network change. The network change may be any network change, including additional network elements, additional pathways, removal of elements, new routing rules, or any other network change. In some embodiments, a network engineer may desire to see how the network change may affect the network. To test the network change, then network engineer may develop a verification test using a general-purpose programming language.

The testing framework may receive 502 the network verification test. The network verification test may include test parameters, including test assertions, packet assertions, and other test parameters. The method 500 may also include retrieving 504 network data from one or more data sources. The network data and the one or more data sources may be based on the test parameters retrieved by the testing framework. For example, based on the assertions in the verification test, the testing framework may retrieve only the network data that is relevant to the verification test. In some embodiments, the method 500 may include building 506 a representation of the network from the network data. The representation of the network may be a model of the network that only includes portions of the network relevant to the network verification test, as identified by the test parameters.

The method 500 may further include applying 508 the network verification test to the representation of the network. In some embodiments, the network verification test may be written in a general-purpose programming language, such as C #. In some embodiments, the network verification test may be separate from the representation of the network. In this manner, the network engineer only needs to develop the network verification test, without modifying any of the internal structure of the representation of the network.

In some embodiments, the method 500 may further include preparing a test report that includes the results of the network verification test. In some embodiments, a network engineer may analyze the test report and repair any identified problems before they are implemented in the network and/or before they cause problems in the network.

Figure 6:
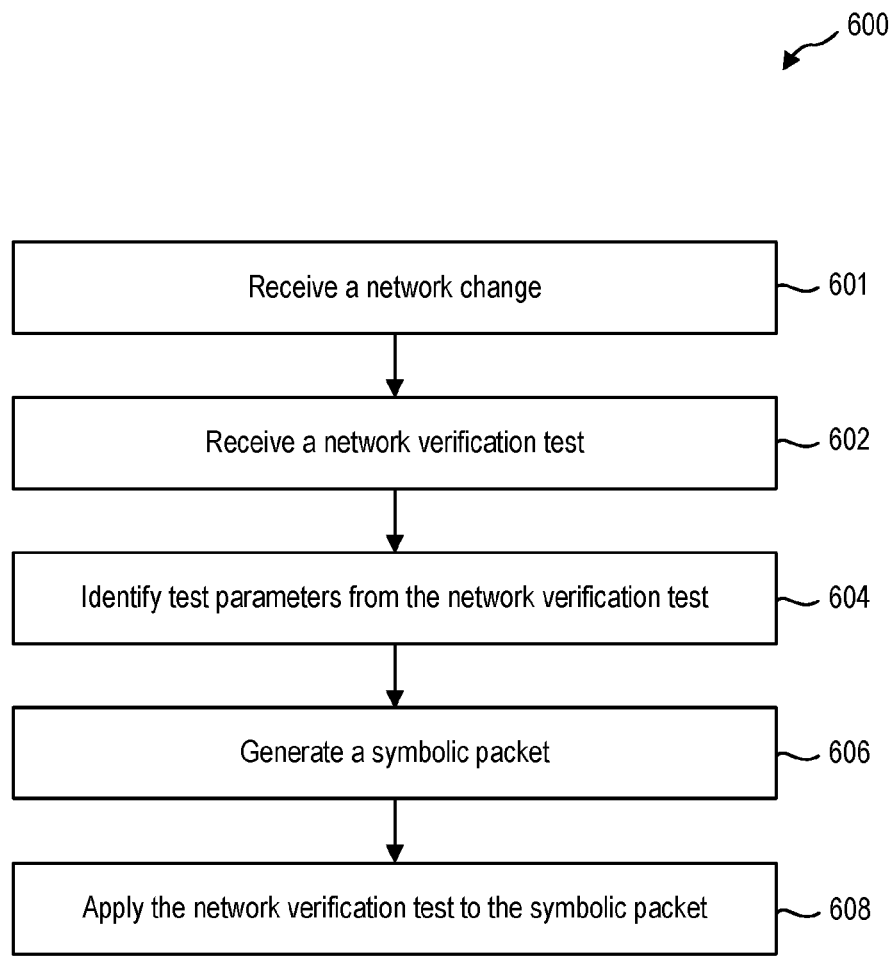
FIG. 6 is representation of another method for verifying a network, according to at least one embodiment of the present disclosure.

FIG. 6 is a representation of a method 600 for verifying a network, according to at least one embodiment of the present disclosure. The method 600 may be implemented using the testing framework 316 of FIG. 3. In other words, the testing framework 316 may implement the acts and steps of the method 600.

The method 600 may include receiving 601 a network change. The network change may be any network change, including additional network elements, additional pathways, removal of elements, new routing rules, or any other network change. In some embodiments, a network engineer may desire to see how the network change may affect the network. To test the network change, then network engineer may develop a verification test using a general-purpose programming language.

The method 600 may further include receiving 602 a network verification test at the testing framework. The method may further include identifying 604 test parameters from the network verification test. The method 600 may additionally include generating 606 a symbolic packet. The symbolic packet may be generated using an equivalence class for a plurality of data packets. The equivalence class may be generated by the test orchestrator using the test parameters. In some embodiments, the test parameters may include a packet assertion. The packet assertion may be evaluated based on a packet library of symbolic packet data types.

In some embodiments, the method 600 may further include applying 608 the network verification test to the symbolic packet. In some embodiments, the network verification test may include test assertions. The test assertions may be network engineer identified callbacks to portions of the structure of the network. The symbolic packet may be tested against these callbacks based on the parameters of the symbolic packet and the structure from the test assertion.

Figure 7:
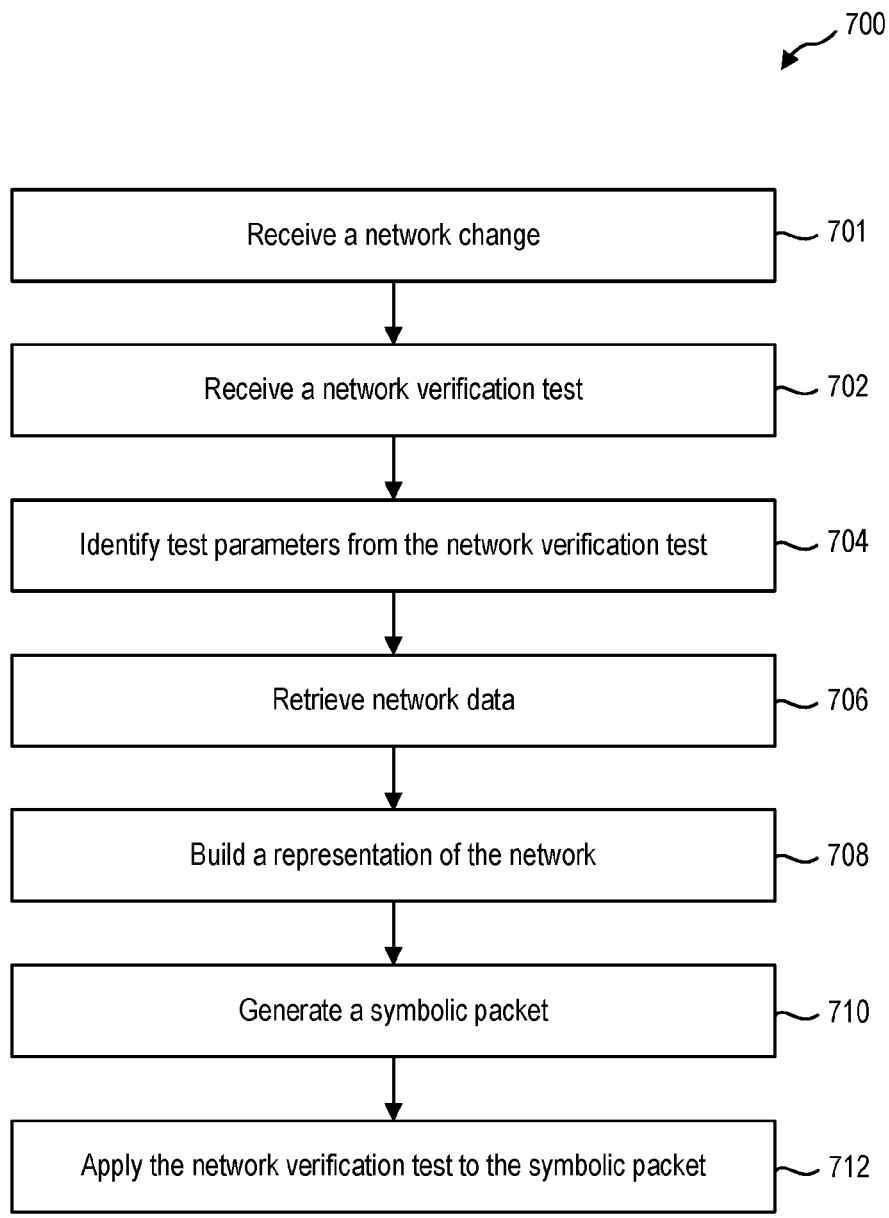
FIG. 7 is a representation of yet another method for verifying a network, according to at least one embodiment of the present disclosure.

FIG. 7 is a representation of a method 700 for verifying a network, according to at least one embodiment of the present disclosure. The method 700 may be implemented using the testing framework 316 of FIG. 3. In other words, the testing framework 316 may implement the acts and steps of the method 700.

The method 700 may include receiving 701 a network change. The network change may be any network change, including additional network elements, additional pathways, removal of elements, new routing rules, or any other network change. In some embodiments, a network engineer may desire to see how the network change may affect the network. To test the network change, then network engineer may develop a verification test using a general-purpose programming language.

The method 700 may include receiving 702 a network verification test. Test parameters may be identified 704 and network data may be retrieved 706 based on the test parameters. The method 700 may include building 708 a representation of the network from the network data. A symbolic packet plurality of data packets may be generated 710, and the network verification test may be applied 712 to the symbolic packet.

Figure 8:
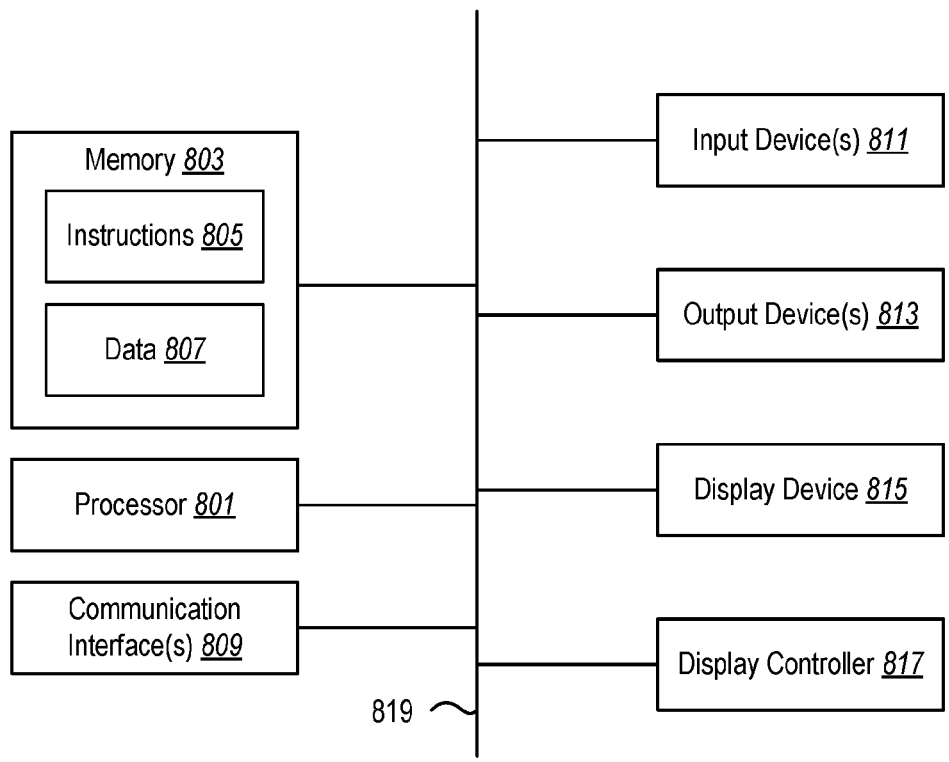
FIG. 8 is a representation of a computing system, according to at least one embodiment of the present disclosure.

Reference is now made to FIG. 8. One or more computing devices 800 can be used to implement at least some aspects of the techniques disclosed herein. FIG. 16 illustrates certain components that can be included within a computing device 800. The computing device 800 shown in FIG. 8 is an example of the computing system used to implement the testing framework 316 of FIG. 3.

The computing device 800 includes a processor 801 and memory 803 in electronic communication with the processor 801. Instructions 805 and data 807 can be stored in the memory 803. The instructions 805 can be executable by the processor 801 to implement some or all of the methods, steps, operations, actions, or other functionality that is disclosed herein. Executing the instructions 805 can involve the use of the data 807 that is stored in the memory 803. Unless otherwise specified, any of the various examples of modules and components described herein can be implemented, partially or wholly, as instructions 805 stored in memory 803 and executed by the processor 801. Any of the various examples of data described herein can be among the data 807 that is stored in memory 803 and used during execution of the instructions 805 by the processor 801.

Although just a single processor 801 is shown in the computing device 800 of FIG. 16, in an alternative configuration, a combination of processors (e.g., an ARM and DSP) could be used.

The computing device 800 can also include one or more communication interfaces 809 for communicating with other electronic devices. The communication interface(s) 1609 can be based on wired communication technology, wireless communication technology, or both. Some examples of communication interfaces 809 include a Universal Serial Bus (USB), an Ethernet adapter, a wireless adapter that operates in accordance with an Institute of Electrical and Electronics Engineers (IEEE) 802.11 wireless communication protocol, a Bluetooth® wireless communication adapter, and an infrared (IR) communication port.

A computing device 800 can also include one or more input devices 811 and one or more output devices 813. Some examples of input devices 811 include a keyboard, mouse, microphone, remote control device, button, joystick, trackball, touchpad, and lightpen. One specific type of output device 813 that is typically included in a computing device 800 is a display device 815. Display devices 815 used with embodiments disclosed herein can utilize any suitable image projection technology, such as liquid crystal display (LCD), light-emitting diode (LED), gas plasma, electroluminescence, or the like. A display controller 817 can also be provided, for converting data 807 stored in the memory 803 into text, graphics, and/or moving images (as appropriate) shown on the display device 815. The computing device 800 can also include other types of output devices 813, such as a speaker, a printer, etc.

The various components of the computing device 800 can be coupled together by one or more buses, which can include a power bus, a control signal bus, a status signal bus, a data bus, etc. For the sake of clarity, the various buses are illustrated in FIG. 16 as a bus system 819.

The techniques described herein may be implemented in hardware, software, firmware, or any combination thereof, unless specifically described as being implemented in a specific manner. Any features described as modules, components, or the like may also be implemented together in an integrated logic device or separately as discrete but interoperable logic devices. If implemented in software, the techniques may be realized at least in part by a non-transitory computer-readable medium having computer-executable instructions stored thereon that, when executed by at least one processor, perform some or all of the steps, operations, actions, or other functionality disclosed herein. The instructions may be organized into routines, programs, objects, components, data structures, etc., which may perform particular tasks and/or implement particular data types, and which may be combined or distributed as desired in various embodiments.

The steps, operations, and/or actions of the methods described herein may be interchanged with one another without departing from the scope of the claims. In other words, unless a specific order of steps, operations, and/or actions is required for proper functioning of the method that is being described, the order and/or use of specific steps, operations, and/or actions may be modified without departing from the scope of the claims.

The term "determining" (and grammatical variants thereof) encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element or feature described in relation to an embodiment herein may be combinable with any element or feature of any other embodiment described herein, where compatible.

Numbers, percentages, ratios, or other values stated herein are intended to include that value, and also other values that are "about" or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to embodiments disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims.

The terms "approximately," "about," and "substantially" as used herein represent an amount close to the stated amount that still performs a desired function or achieves a desired result. For example, the terms "approximately," "about," and "substantially" may refer to an amount that is within less than 5% of, within less than 1% of, within less than 0.1% of, and within less than 0.01% of a stated amount. Further, it should be understood that any directions or reference frames in the preceding description are merely relative directions or movements. For example, any references to "up" and "down" or "above" or "below" are merely descriptive of the relative position or movement of the related elements.

The described embodiments are to be considered as illustrative and not restrictive, and the present disclosure may be embodied in other forms besides those specifically described herein. The scope of the disclosure is, therefore, indicated by the appended claims rather than by the foregoing description. Changes that come within the meaning and range of equivalency of the claims are to be embraced within their scope.

The invention claimed is:

1. A method, comprising:
    identifying a network change to be implemented on a network, the network change affecting transfer of data packets through the network, the network being implemented on a cloud computing network;
    receiving a network verification test including test parameters determined to correlate to network elements affected by the network change, the network verification test including one or more invariants, wherein the one or more invariants include a condition for the transfer of the data packets through the network, and wherein the network verification test tests the transfer of the data packets through the network;
    retrieving network data from the network elements identified by the test parameters;
    building a representation of the network from the network data on which to run the network verification test, the representation of the network including representations of the network elements identified by the test parameters, the representation of the network being configured to transfer simulated data packets across the network elements; and
    applying the network verification test to the representation of the network data to determine whether the condition included in the one or more invariants is satisfied.

2. The method of claim 1, wherein the network data includes at least one of network topology, device metadata, IP addressing information, routing tables, or device configurations.

3. The method of claim 2, wherein applying the network verification test includes testing at least one element of the network data.

4. The method of claim 1, wherein building the representation of the network includes building the representation of the network only from the network data received from the network elements.

5. The method of claim 1, wherein the network verification test is written in a general-purpose programming language.

6. The method of claim 1, wherein the network verification test is separate from the representation of the network.

7. The method of claim 1, further comprising preparing a test report including results of the network verification test.

8. The method of claim 7, wherein the test report includes results from each of multiple elements of the network verification test.

9. The method of claim 1, wherein receiving the network verification test includes identifying the test parameters from the network verification test.

10. The method of claim 1, wherein building the representation of the network includes generating a network graph of the network.

11. A system, comprising:
    one or more processors;
    a memory in electronic communication with the one or more processors; and
    instructions stored in the memory, the instructions being executable by the one or more processors to:
        receive a network change to be implemented on a network, the network change affecting transfer of data packets through the network, the network being implemented on a cloud computing network;
        receive a network verification test;
        identify test parameters from the network verification test that correlate to specific network elements that will be affected by the network change, the test parameters including one or more invariants, wherein the one or more invariants include a condition for the transfer of data packets through the network, and wherein the network verification test tests the transfer of data packets and identifies network elements relevant to the transfer of the data packets through the network;
        retrieve network data from the network elements identified by the test parameters;

build a representation of the network from the network data on which to run the network verification test, the representation of the network including representations of the network elements identified by the test parameters, the representation of the network being configured to transfer simulated data packets across the network elements;

generate a symbolic packet based on an equivalence class for a plurality of data packets, the equivalence class correlating the plurality of data packets based on a similar data packet trait used to test the condition of the one or more invariants; and apply the network verification test to the symbolic packet to determine whether the condition included in the one or more invariants is satisfied.

12. The system of claim 11, wherein the network verification test is written in a general-purpose programming language.

13. The system of claim 11, wherein the network verification test is separate from the representation of the network.

14. The system claim 11, wherein generating the symbolic packet includes:
creating an abstract syntax tree based on a packet assertion in the network verification test; and
analyzing the abstract syntax tree with a binary decision diagram.

15. The system claim 11, wherein generating the symbolic packet includes:
creating an abstract syntax tree based on a packet assertion in the network verification test; and
analyzing the abstract syntax tree with a binary decision diagram.

16. A method, comprising:
identifying a network change to be implemented on a network, the network change affecting transfer of data packets through the network, the network being implemented on a virtual network;

receiving a network verification test including test parameters determined to correlate to network elements affected by the network change, the network verification test including one or more invariants, wherein the one or more invariants include a condition for the transfer of the data packets through the network, and wherein the network verification test tests the transfer of the data packets through the network;

retrieving network data from the network elements identified by the test parameters;

building a representation of the network from the network data on which to run the network verification test, the representation of the network including representations of the network elements identified by the test parameters, the representation of the network being configured to transfer simulated data packets across the network elements; and applying the network verification test to the representation of the network data to determine whether the condition included in the one or more invariants is satisfied.

17. The method of claim 16, wherein the network data includes at least one of network topology, device metadata, IP addressing information, routing tables, or device configurations.

18. The method of claim 17, wherein applying the network verification test includes testing at least one element of the network data.

19. The method of claim 16, wherein building the representation of the network includes building the representation of the network only from the network data received from the network elements.

20. The method of claim 16, wherein the network verification test is written in a general-purpose programming language.

* * * * *